United States Patent [19]

Kutz

[11] Patent Number: 5,685,734
[45] Date of Patent: Nov. 11, 1997

[54] UNIVERSALLY ADAPTABLE ELECTRICAL CONNECTOR AND METHOD OF USING SAME

[75] Inventor: Donald A. Kutz, Del Mar, Calif.

[73] Assignee: HM Electronics, Inc., San Diego, Calif.

[21] Appl. No.: 357,448

[22] Filed: Dec. 16, 1994

Related U.S. Application Data

[63] Continuation of Ser. No. 60,018, May 10, 1993, abandoned, which is a continuation-in-part of Ser. No. 919,880, Jul. 27, 1992, Pat. No. 5,484,668.

[51] Int. Cl.$^6$ .................................................. H01R 4/24
[52] U.S. Cl. ..................... 439/409; 324/158 F; 439/371
[58] Field of Search .................... 439/371, 700, 439/824, 578–585, 478, 482, 367, 368, 140, 141, 146, 409; 124/158 F

[56] References Cited

U.S. PATENT DOCUMENTS

| | | | |
|---|---|---|---|
| 4,734,050 | 3/1988 | Negre et al. | 439/824 |
| 5,110,363 | 5/1992 | Hardy | 439/367 |
| 5,122,070 | 6/1992 | Lebris et al. | 439/140 |
| 5,175,493 | 12/1992 | Langgard | 439/482 |
| 5,226,827 | 7/1993 | Corcoles et al. | 439/482 |
| 5,273,454 | 12/1993 | Shotey | 439/367 |

*Primary Examiner*—David L. Pirlot
*Attorney, Agent, or Firm*—Bernard L. Kleinke; Peter P. Scott

[57] ABSTRACT

A universally adaptable battery charger connector which couples electrically a battery charger outlet to pairs of terminals of different types and kinds of rechargeable battery devices. The universal adaptable battery charger includes an attachment arrangement for engaging releasably one of the pairs of battery device terminals. The attachment arrangement includes a pair of electrodes coupled electrically to a battery charger outlet for helping to supply electrical current to the battery device terminals. The universal connector also includes a securing device for mounting removably on the battery device to be charged. Each one of the electrodes includes a resilient contact for pressing resiliently into engagement with the terminals to maintain an electrical and mechanical contact between the securing device and the battery device terminals. Thus, the electrodes can be positioned in engagement with the terminals independent of the size and shape of the battery device as well as of the configuration of the terminals.

31 Claims, 5 Drawing Sheets

UNIVERSALLY ADAPTABLE ELECTRICAL CONNECTOR AND METHOD OF USING SAME

CROSS-REFERENCE TO RELATED APPLICATIONS

This is a continuation of application Ser. No. 08/060,018, filed on May 10, 1993, now abandoned, which is a continuation-in-part application of U.S. patent application, Ser. No. 07/919,880, filed Jul. 27, 1992 and entitled "UNIVERSALLY ADAPTABLE BATTERY CHARGER CONNECTER AND METHOD OF USING SAME" U.S. Pat. No. 5,484,668.

TECHNICAL FIELD

This invention relates in general to an electrical connector and method of using same, and it more particularly relates to a universally adaptable electrical connector and method for coupling the connector to an electrical connection point.

BACKGROUND ART

Modern electronics has led to the development of very sophisticated electrical circuits and devices. Such circuits and associated devices come in a variety of shapes, sizes and different forms. For example, electrical connection points within a given electrical circuit may be recessed, protruding or substantially flush with the surface of the device.

The wide variety of different types and kinds of electrical circuits and devices has created a problem in that conventional electrical connectors are not adapted to be used conveniently with such a variety of different kinds of electrical connection points. In this regard, for example, a conventional alligator clip type connector generally may not be employed with recessed electrical connection points as such points may be both difficult to reach and lack any type of clip receiving surface. Similarly, a conventional probe type connector generally may not be employed where "hands free" operations are required or when long term electrical readings may be required. For example, probing and monitoring a battery terminal of a battery under a fast charge may require the terminal to be probed for up to two or three hours. Thus, it would not be practical to hold such a probe in a fixed position for such a long period of time.

Because of the problems associated with such a variety of different types and kinds of electrical connection points, those persons charged with maintaining and testing such circuits must purchase a variety of different types and kinds of electrical connectors. Acquiring such connectors is not only time consuming, but is also very expensive.

In an attempt to accommodate the different types and kinds of electrical circuits, devices and electrical connection points, strap type connectors have been employed. In this regard, a probe is held in position on a given electrical connection point by a strap so a hands free operation may be achieved.

While using a strapped probe has been successful for some applications, such an arrangement has not been entirely satisfactory. For example, the probe may walk or rock away from the connection point, particularly if the surface of the connection point is very smooth or protruding.

Another problem associated with utilizing a strapped probe has been positioning and holding the probe in contact with the electrical connection point, while the strap is being secured to the device or circuit. In this regard, it has been difficult to hold the probe stationary relative to the connection point while the strap is tightened to exert a sufficient amount of pressure for probe holding purposes.

Therefore, it would be highly desirable to have a new and improved electrical connector that can be used with a variety of different types and sizes of electrical devices and circuits as well as different types of electrical connection points. Such an electrical connector should be easily and quickly connected to various kinds of recessed, protruding or substantially flat smooth electrical connection points.

DISCLOSURE OF INVENTION

Therefore, the principal object of the present invention is to provide a new and improved universally adaptable electrical connector and method of using it for enabling coupling to variety of different types of electrical connection points.

It is another object of the present invention to provide such a new and improved electrical connector and method of using it for enabling coupling to a variety of different types and sizes of electrical circuits and devices.

Still yet another object of the present invention is to provide such a new and improved electrical connector and method of using it for enabling substantially hands free operations once the electrical connector has been coupled securely to the electrical circuit or device.

Briefly, the above and further objects of the present invention are realized by a universally adaptable electrical connector which couples electrically an electronic apparatus to different types and sizes of electrical devices having electrical connection points with different types of surface abnormalities, such as recessed, protruding and smooth surfaces. The universally adaptable electrical connector includes a probe head having at least one retractable probe and at least one stabilizing member to engage an electrical connection point and to prevent the probe from moving away from the connection point. A buckle and strap having one surface covered with an adhesive pile, and a movable member having a plurality of hooks on at least two opposing surfaces for engaging releasably at least two different spaced apart areas of adhesive pile on the strap enables the probe head to be secured to the connection point.

In use, the strap is wrapped loosely around the electrical device with the terminal end of the strap passing through the buckle to permit two different spaced apart areas of adhesive pile on the strap to be opposed to one another. Next, the buckle is positioned spaced apart from the electrical connection point. The movable member is then moved and secured by one of its surfaces to a position on the adhesive pile surface closest to the electrical connection point and substantially directly opposite the connection point. Using one hand, the user positions the probe head on the electrical device with the probe engaging the connection point and with the other hand draws the terminal end of the strap tight until the strap firmly engages the probe. When the strap firmly engages the probe, the other hooked surface of the movable member is pressed into engagement with the other adhesive pile surface to secure the strap in position.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein.

BEST MODE FOR CARRYING OUT THE INVENTION

Figure 1:
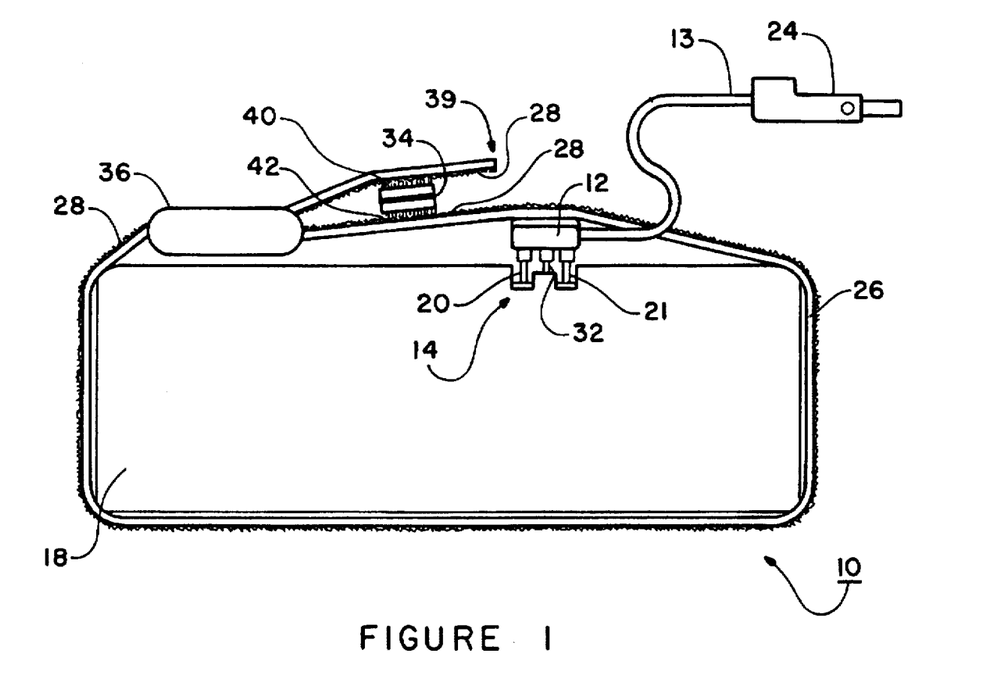
FIG. 1 is a pictorial view of a universally adaptable connector, which is constructed in accordance with the present invention and which is illustrated fastened to an electronic device.
Figure 2:
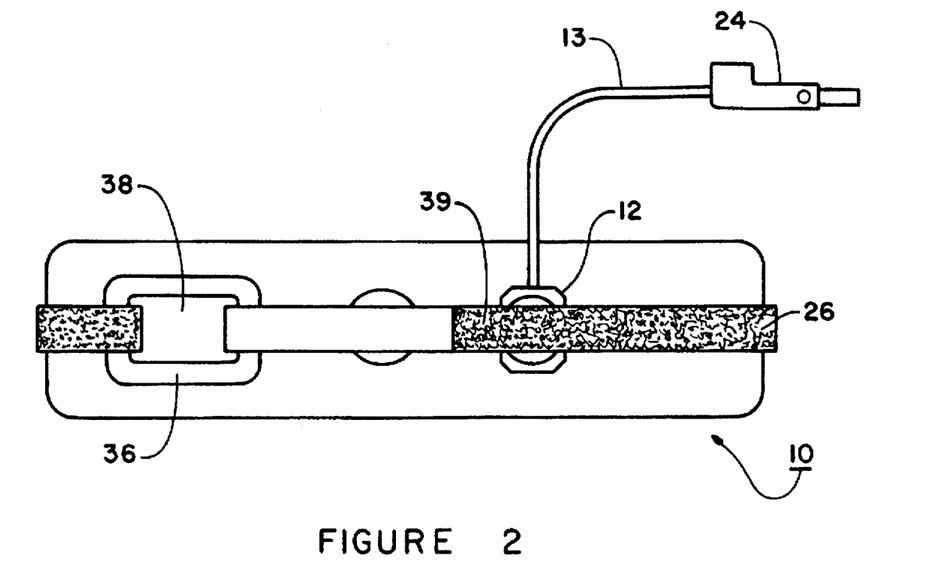
FIG. 2 is a top plan view of the universally adaptable connector of FIG. 1.

Referring now to the drawings and more particularly to FIGS. 1 and 2 thereof, there is shown a universally adaptable connector 10, which is constructed in accordance with the present invention. The connector 10 can be readily and conveniently used for coupling electrically an electronic apparatus (not shown) to terminals or electrical connection points, such as an electrical connection point 14 of an electronic device 18. The connector 10 enables a wide variety of different types and kinds of devices, such as rechargeable batteries, battery packs, printed circuit boards, etc. to be connected electrically to the electronic apparatus.

The connector 10 generally comprises a probe head indicated generally at 12 for supporting an electrical cable conductor 13 connected electrically to the electronic apparatus by a jack 24. The probe head 12 includes a pair of spring loaded electrodes 20 and 21 which are adapted to engage electrical connection points, such as the terminal or connection point 14. The electrodes 20 and 21 are also coupled electrically to the electrical cable conductor 13. A strap 26 having a Velcro or nylon pile material 28 on one external surface thereof is affixed to the outer surface of the probe head. In this regard, the strap 26 can be wrapped around the device 18, as best seen in FIGS. 1 and 2, to secure removably the strap 26 to the device 18.

The probe head 12 also includes a resilient contact such as a resilient contact 32 for pressing resiliently into engagement with the device 18 to help stabilize the connector 10 relative to the device 18.

In order to help secure the strap 26 to the device 18, the connector 10 also includes a buckle cinch 36 secured at one end of the strap 26 and a movable hook member 34. The buckle cinch 36 includes an opening 38 which is dimensioned for receiving the opposite free end 39 (FIG. 1) of the strap 26 therethrough, as indicated in FIG. 1.

The moveable hook member 34 has two opposing hook faces 40 and 42 that cooperate with the strap 26 to secure the strap 26 to the device 18. In this regard, when the free end 36 of the strap is pulled through opening 38 it causes the Velcro pile material 28 to be disposed in two opposing sections. Thus, the hook member 34 can be first secured adhesively removably to the pile surface closest to the device 18 via hook face 42 and then, when the strap 26 is drawn tight through the buckle 36, the other section can be secured adhesively removably to the hook face 40. In this manner, the strap 26 is secured to the device 18.

In use, the connector 10 is grasped and held in the hands of a user in such a manner to enable the strap 26 to be wrapped securely about the body or housing of the device 18. Once the strap 26 is wrapped about the exterior of the device 18, the free end 39 of the strap 26 is positioned through the opening 38 in the buckle cinch 36 and pulled a sufficient distance to prevent the strap 26 from becoming dislodged from the buckle cinch 36. The user then adjusts the position of the electrodes 20 and 21 until they engage the terminal 14 mechanically and electrically.

After adjusting the electrodes 20 and 21, the user pulls the free end 39 of strap 26 a further sufficient distance until the buckle cinch 36 firmly engages the housing of the device 18. The user then causes the Velcro piles 28 and hook member 34 to engage one another, thus securing the strap 26 to the device 18 while simultaneously pressing the electrode 20 into engagement with the terminal 14.

In this manner, the electrodes 20 and 21 firmly engage the terminal 14 to facilitate completing an electrical path including the terminal 14, the electrodes 20 and 21, a conductor cable 13, the jack 24, and the outlet of the apparatus (not shown), for connecting electrically the device 18 to the electronic apparatus.

While the preferred embodiment of the present invention discloses a single strap with a probe head or base member having a pair of electrodes, it will be understood by those skilled in the art that more or less electrodes can be disposed on a base member for those devices with more or less electrical connection points. It will also be understood that a plurality of straps, and multiple probe heads can be utilized to accommodate devices with two or more electrical connection points. Thus, more than a pair of connectors is possible within the true spirit and scope of the invention. Moreover, although a strap is the preferred embodiment, it is understood that other types of materials may be employed, such as elastic bands, rubber bands and the like.

Figure 3:
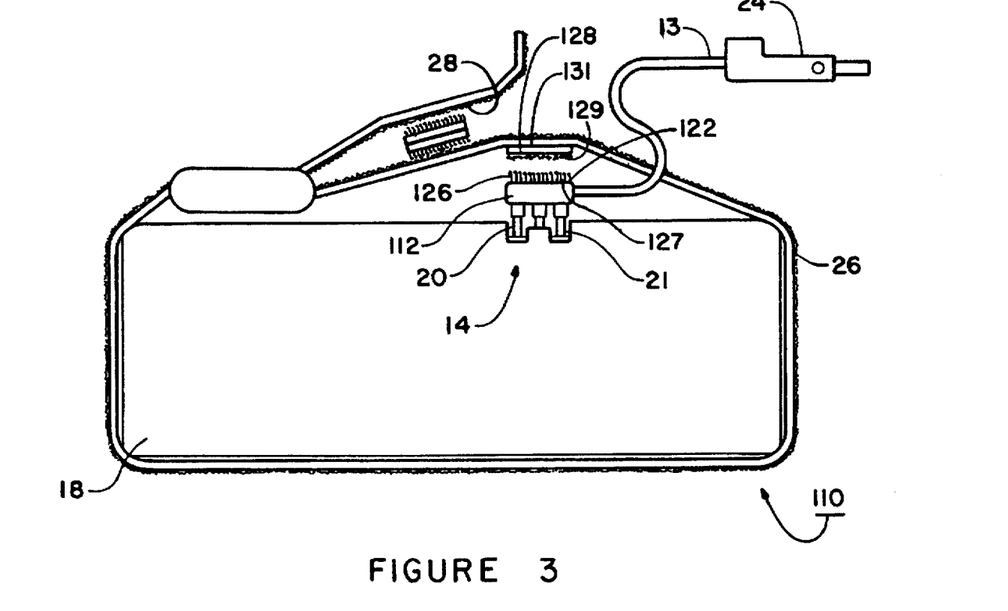
FIG. 3 is a pictorial view of another universally adaptable connector, which is constructed in accordance with the present invention and which is illustrated fastened to an electronic device.
Figure 4:
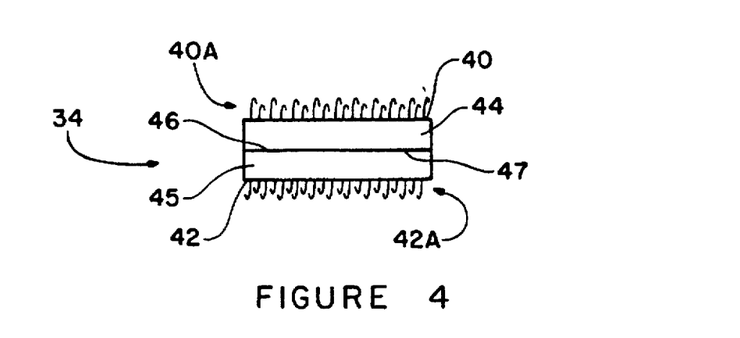
FIG. 4 is a side elevational view of a movable hook member of FIG. 1.
Figure 5:
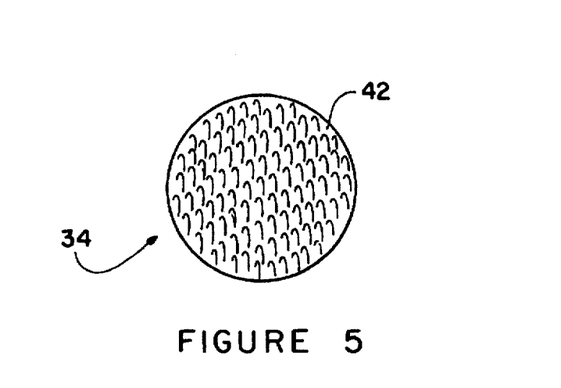
FIG. 5 is a bottom plan view of the movable hook member of FIG. 4.

Considering now the moveable hook member 34 in greater detail with reference to FIGS. 3 and 4, the movable hook member 34 includes an upper portion 44 having a smooth surface 46 and another surface having a smooth surface 46 and another surface having a plurality of Velcro or nylon hooks shown generally at 40A for defining the hook face 40, and a lower portion 45 having a smooth surface 47 and another surface having a plurality of Velcro or nylon hooks shown generally at 42A for defining the hook face 42.

The upper portion 44 and the lower portion 45 are generally circular in shape and are secured together at surfaces 46 and 47 respectively by any conventional means, such as by gluing.

The diameter of the hook member 34 is selected to be slightly larger than the width of the strap 24 so that the hook member 34 can be easily grasped by a user in order to remove the member 34 from engagement with the strap 24. In this regard, the upper and lower portions 44 and 45 are substantially identical in size and shape.

Referring now to FIG. 3, there is illustrated another universally adaptable terminal connector 110, which is adapted to be utilized with a terminal device 18. Terminal connector 110 is substantially identical to terminal device 10 except that it includes a probe head 112 that is adapted to be secured removably to the strap 26. For the purpose of brevity, those parts of the terminal connector 110 which are substantially identical to those parts of the terminal connector 10 have been identified by the same reference character and will not be described in greater detail.

In order to enable the probe head 112 to be secured removably to the strap 26, the connector 110 includes an attachment or hook member 122 having a plurality of Velcro or nylon hooks 126 on one of its surfaces and a bonding agent 127 on the opposite facing surface. In this regard, the surface with the bonding agent 127 is secured to the top surface of the probe head 112 by pressing the hook member 122 onto the top surface of the probe head 122.

The terminal connector 110 also includes a movable pile member 128 which has a Velcro or nylon pile material 129 on one external surface, and a bonding agent 131 on the opposite facing surface. The surface with the bonding agent 131 is secured to the smooth surface of the strap 26 in a position opposite the terminal or connection point 14. When so positioned, the Velcro pile 129 is exposed.

In operation, in order to secure the probe head removably to the strap 26, the Velcro hook member 122 is secured by its bonding agent 127 to the probe head 112. Next the hooks 126 are brought into engagement with the Velcro pile material 129 on the movable pile member 128. Thus, the probe head 112 is secured removably to the strap 26.

In the preferred form of the present invention, a movable pile member 128 is illustrated affixed to the strap 26 for engagement with the Velcro hook member 122. It will be understood by those skilled in the art that the movable hook member 122 may be affixed to the strap 26 while the Velcro pile member 128 (FIG. 11) may be secured to the probe head 112.

Figure 11:
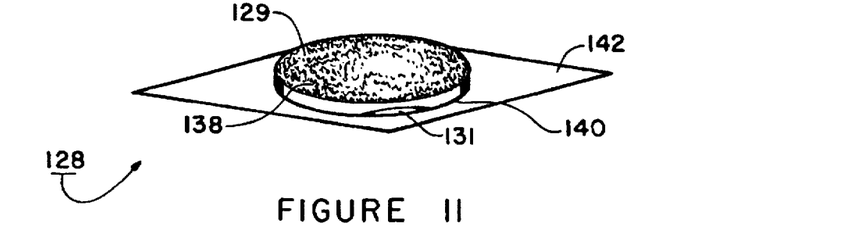
FIG. 11 is a diagrammatic pictorial view of a movable pile member for use with the probe head of FIG. 3.

Considering the movable pile member 128 in greater detail with reference to FIG. 11, the movable pile member 128 includes an upper face 138 having the Velcro pile material 129 disposed thereon and a lower face 140 having the adhesive agent 131 disposed thereon. For the purpose of storage, a backing sheet 142 is affixed to the adhesive agent 142. The backing sheet 142 is removed when the movable member 128 is be secured to the strap 26.

Figure 12:
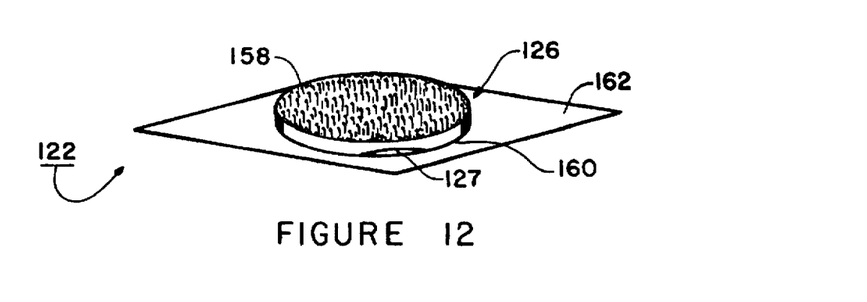
FIG. 12 is a diagrammatic pictorial view of a movable hook member for use with the probe head of FIG. 3.

Considering now the movable hook member 122 in greater detail with reference to FIG. 12, the movable hook member 122 generally includes an upper face 158 having the plurality of Velcro hooks, shown generally at 126, disposed thereon and lower face 160 having the adhesive agent 127 disposed thereon. For the purpose of storage, a backing sheet 162 is affixed to the adhesive agent 162. The backing sheet 162 prevents the agent 161 from securing to other objects. The backing sheets 162 is similar to backing sheet 142.

Figure 6:
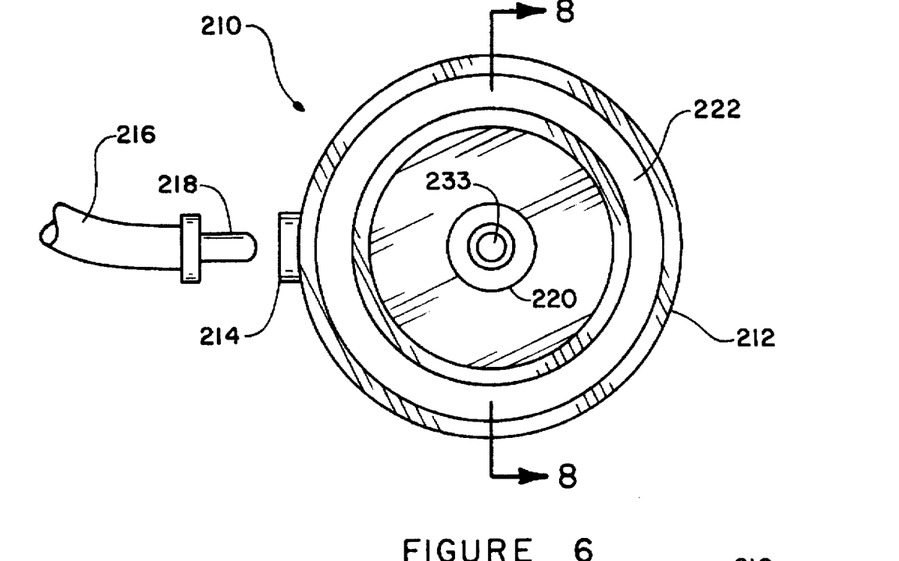
FIG. 6 is a bottom plan view of another universal adaptable connector, which is constructed in accordance with the present invention.
Figure 7:
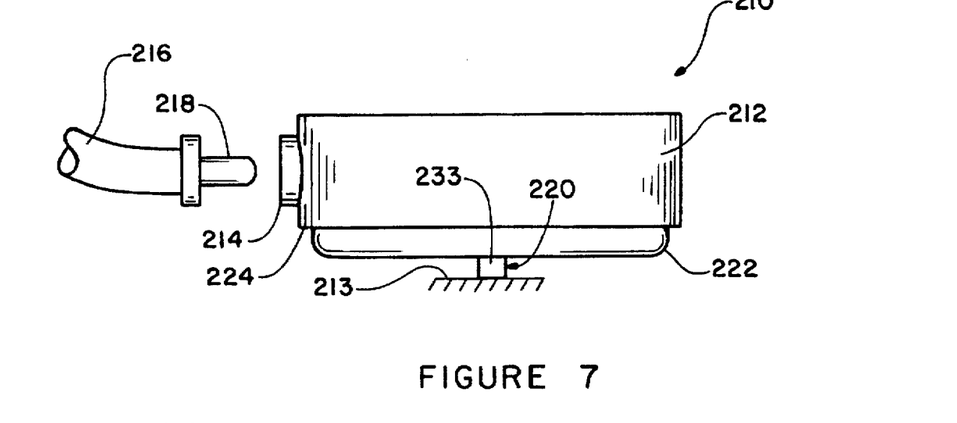
FIG. 7 is a side elevational view of the universal adaptable connector, of FIG. 6.
Figure 8:
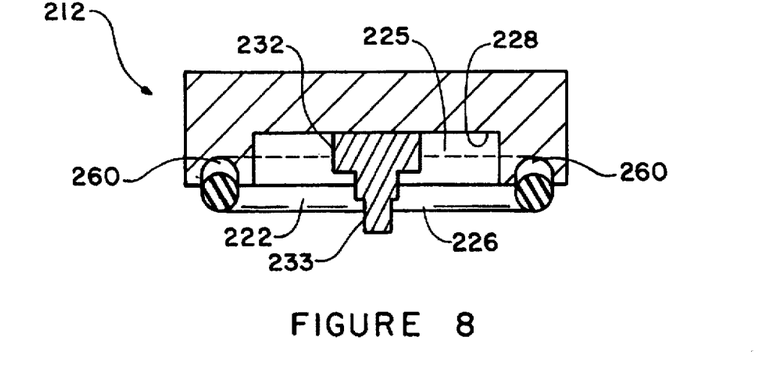
FIG. 8 is a cross-sectional view of the universal adaptable connector of FIG. 6 taken along line 8—8.

Referring now the drawings and move particularly to FIGS. 6–8 thereof, there is shown a universally adaptable terminal connector 210, which is constructed in accordance with the present invention. The terminal connector 210 is adapted to be utilized with an electronic apparatus (not shown) for coupling electrically the apparatus to an electrical connection point, such as an electrical connection point 214.

The connector 210 generally comprises a circular shaped probe head 212 adapted to be secured to a terminal device 213 for establishing electrical contact with a terminal or electrical connection point, such as the connection point 214. The probe head 212 is composed of a molded plastic material and includes a jack 214 adapted to be electrically coupled to the electronic apparatus via an electrical conductor 216 have a plug 218. In this regard, the jack 214 is adapted to receive the plug 218 in a snug, reliable manner.

From the foregoing, it will be understood by those skilled in the art that by using such a jack/plug arrangement a wide variety of different types and kinds of probe heads may be connected electrically to the electronic apparatus depending upon the type of electrical connection point to be coupled to the electronic apparatus.

The connector 210 also includes a spring loaded electrode 220 which is adapted to engage the connection point 214. A stabilizing member or compression ring 222 extends downwardly perpendicularly from an underside 224 of the probe head 212 for engaging the terminal device 213. In this regard, the stabilizer 222 is configured to stabilizing the probe head 212 when the electrode 220 is brought into mechanical and electrical contact with the connection point 214. The retractable stabilizer member 222 cooperates with the electrode 220 to provide a stable platform for positioning the probe head 212 relative to the device 213 and the connection point 214.

Considering now the probe head 212 in greater detail with reference to FIGS. 6 and 8, the probe head 212 is generally circular in shape having a recessed groove 260 (FIG. 8) disposed adjacent to its outer peripheral edge. The groove 260 forming a concentric ring with the outer peripheral edge of the head 212. The groove 260 is dimensioned for receiving therein the stabilizing member 222. In this regard, the stabilizing member 222 is composed of a resilient material which permits the stabilizing member 222 to be received rockably within the grove 260.

The probe head 212 also includes a circular shaped cavity 225 having a centrally disposed sleeve 232 integrally formed therein. The sleeve 232 as will be described hereinafter forms part of the electrode 220.

Considering now the stabilizing member 222 in greater detail with reference to FIGS. 6 and 8, the stabilizing member 222 is generally circular in shape having a generally bulb shaped protuberance 262 at its outer periphery. The stabilizing member 222 is secured within the groove 260 by a press fit or other suitable mounting arrangement. The protuberance 224 is dimensioned to be received within the groove 260 when a base portion 226 of the member 222 is brought into contact with a stationary surface, such as the device 213. The stabilizing member 222 is composed of a resilient rubber material.

Considering now the electrode 220 in grater detail with reference to FIGS. 6 and 8, the electrode 220 generally includes the retaining sleeve 232 which is integrally connected to a bottom portion 228 of the head 212 within the cavity 225. The sleeve 232 depends perpendicularly downward from the bottom 228 centrally disposed within the cavity 225. A central pin 233 is urged resiliently outwardly from the bottom end of the sleeve 232 by means of a bias spring (not shown). In this regard, the spring engages the pin 233 causing it to retract into the sleeve 232 when the distal end of the pin 233 is brought into engagement with an electrical connection point, such as the connection point 214. The pin 233 cooperates with the stabilizing member 222 to provide a stable platform for the probe head 212.

Figure 9:
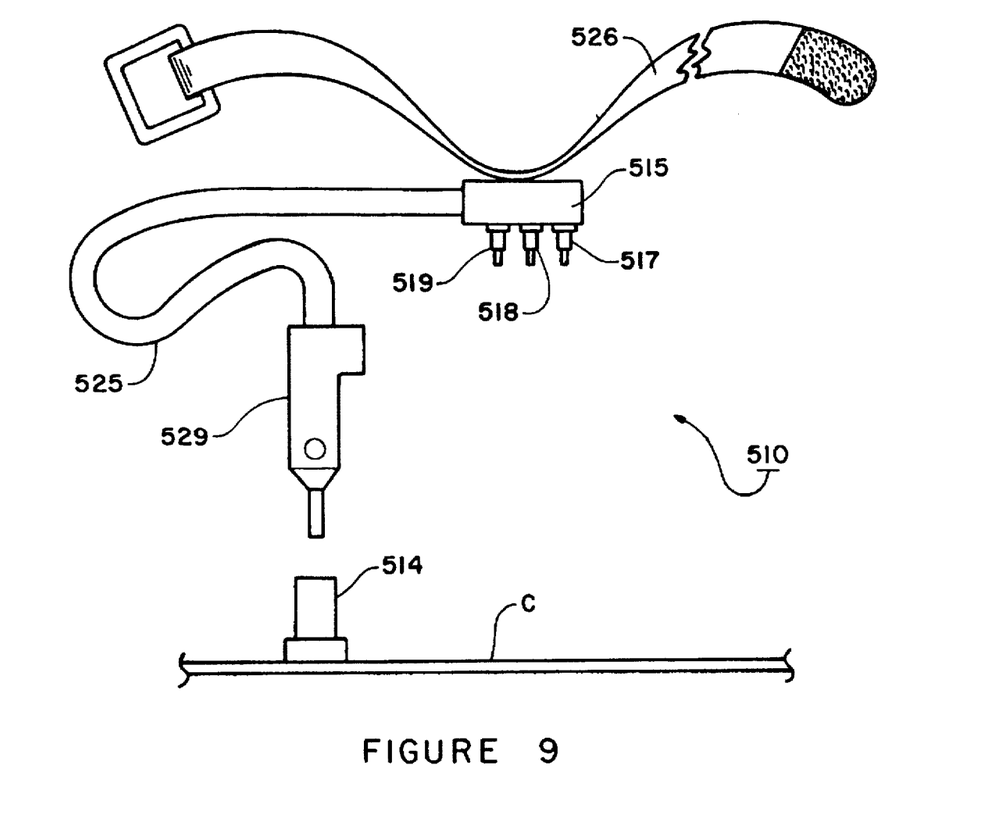
FIG. 9 is a diagrammatic view of yet another universally adaptable connector, which is constructed according to the present invention, and which is shown in the process of being connected electrically to a battery charger.
Figure 10:
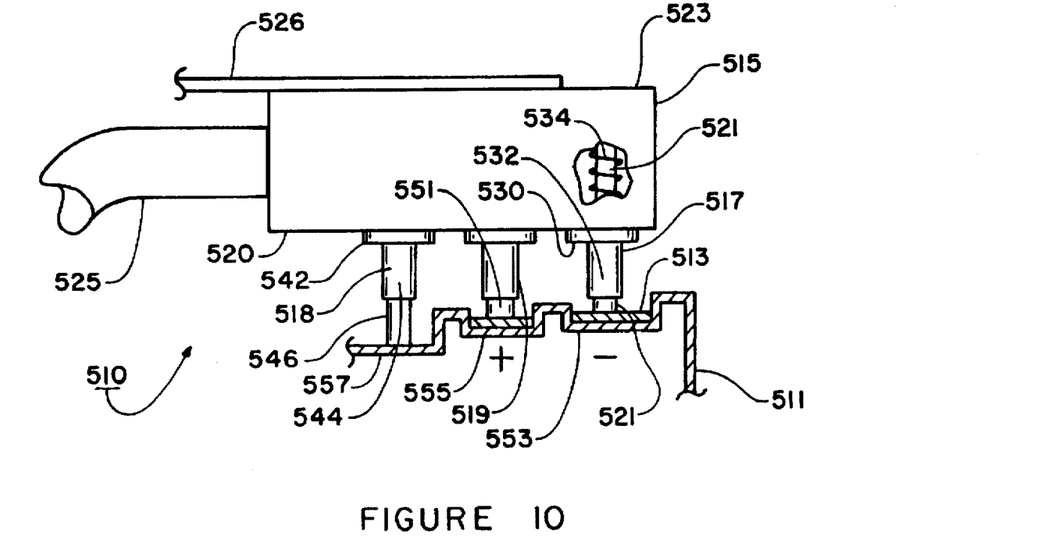
FIG. 10 is a greatly enlarged diagrammatic, fragmentary cut away view of the connector illustrated in FIG. 9 attached to a battery for charging purposes.

Referring now to the drawings and more particularly to FIGS. 9 and 10 thereof, there is shown a universally adaptable terminal connector 510, which is adapted to be utilized with a terminal device, such as a rechargeable battery 511 (FIG. 10), having at least one electrical connection point 513. The terminal connector 510 is similar to connector 10 in that connector 510 can be readily used for coupling a battery charger outlet 514 (FIG. 10) of a battery charger or tester C, to the battery terminal of different types and kinds of rechargeable battery devices having different types and kinds of electrical connection points, such as a recessed plane, or pivoted connection point, in accordance with the method of the present invention.

The connector 510 generally includes an rectangularly shaped base member 515 adapted to be secured to the terminal device 511 by a strap 526 which is similar to strap 26. The base member 515 may be mounted to the strap 526 slidably, adjustably or in a fixed position by conventional means (not shown) depending upon the type of terminal device to be engaged by the terminal connector 510. Three spaced apart spring loaded retractable plunger members 517–519 extend downwardly perpendicularly from an underside 520 of the base member 515 for engaging the terminal device 511 including the negative terminal 513. In this regard, the three plungers 517–519 are arranged in a stabilizing geometric pattern, such as in a linearly disposed row, staggered row or some other geometric pattern which offers a stable platform by virtue of the shape and downward pressure created by the strap 526 and the spring loaded resistance of the independent members 517–519. The telescopically retractable plunger members 517–519 in combination provide a stable platform for positioning the base member 515 in a substantially parallel spaced-apart position from the terminal device 511 to enable the strap 526 to hold securely the connector 510 in mechanical and electrical engagement with the terminal device 511.

A spring loaded electrode pin 521 forms part of the plunger 517 and is connected electrically by means (not shown) to a conductor of a cable 525 of the base member 515. The opposite end of the cable 525 terminates in a conventional mechanical interconnection device, such as a banana jack 529 (FIG. 9) for connecting electrically to the outlet 514.

Considering now the plunger 517 in greater detail with reference to FIG. 10, the plunger 517 generally includes a cylindrical shaped housing 530 which is mounted within the base member 515. At its upper end, the housing 530 is disposed at the underside of the top wall 523 of the base member 515 and extends transversely through the base member 515 terminating slightly below the underside of a bottom wall 520. A cylindrical shaped retaining sleeve 532 is fixed to the bottom end of the housing 530 and depends therefrom for receiving telescopically the central pin 521, which is urged resiliently outwardly from the bottom end of the sleeve 532 as indicated in FIG. 9, by means of a bias spring 534 (FIG. 10). The spring engages the pin 521 causing it to retract into the sleeve 532 when the distal end of the pin 521 is brought into engagement with an electrical connection point such as the electrical connection point 513. The pin 521 cooperates with plungers 518 and 519 to provide a stable platform for the base member 515 so that it is held in a substantially parallel spaced apart manner from the device 511 when attached by its strap 526 to the device 511.

Considering now the plungers 518 and 519 in greater detail, only plunger 518 will now be described as the plungers 518 and 519 are substantially similar.

Referring now to FIG. 10, the plunger 518 provide for mechanical stability only, and do not serve as an electrical function. The plunger 518 generally includes a housing 542 which is mounted in a similar manner as housing 532 within the base member 515.

A fixed sleeve member 544 is mounted to the housing 542 for supporting a spring biased retractable contact member or pin 546. The contact member 546 is adapted to move reciprocate up and down within the sleeve member 544 against the force of a bias spring (not shown), in a similar manner as the plunger 517. The contact member 546 cooperates with plunger 519 as well as pin 521 to provide a platform or base support for the base member 515 relative to the terminal device 511.

In accordance with the present invention, as best seen in FIG. 10, the base 515 can be strapped to the battery 511 by the strap 526 in a very secure and stable manner. It should be noted that the pin 521 of the plunger 517 and a pin 551 of the plunger 519 fit into respective recesses 553 and 555. Additionally, the mechanical plunger 518 has its contact or pin 546 disposed in contact with a surface 557 of the battery 511, at yet a different elevation from the recesses 553 and 555. The retractable nature of the three plungers with their associated bias springs enable the plungers to accommodate various different electrical connection configurations with differing surface abnormalities and thus is universally adaptable. While being universally adaptable, the base 515 is firmly attached to the battery under charge in a very secure manner, so that the battery connection is made in a reliable safe manner.

Figure 13:
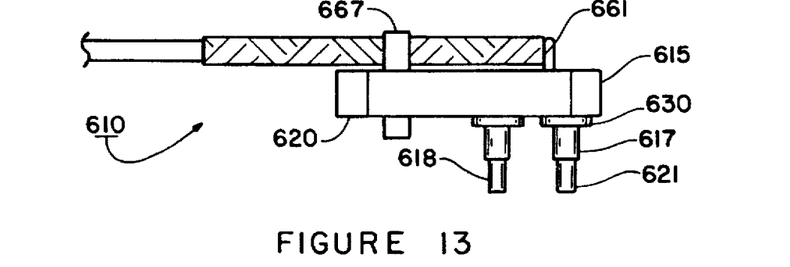
FIG. 13 is an enlarged side elevational view of still yet another universally adaptable battery charger connector, which is constructed in accordance with the present invention.
Figure 14:
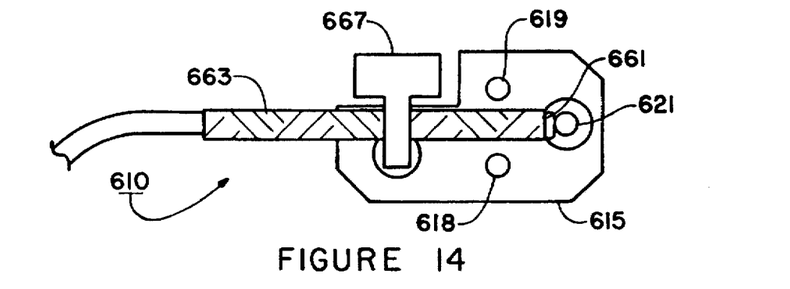
FIG. 14 is an enlarged top plan view of the adaptable battery charger connector of FIG. 13.
Figure 15:
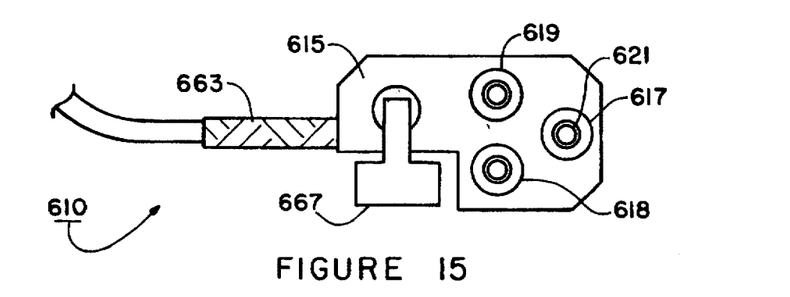
FIG. 15 is an enlarged bottom plan view of the adaptable battery charger connector of FIG. 13.

Referring now to FIGS. 13, 14 and 15, there is shown a universally adaptable terminal connector 610, which is generally similar to the connector 510 of FIGS. 9 and 10, except that the configuration of the plungers is different, and that only one of them serves an electrical function. Thus, the connector 610 can be used for a variety of different batteries (not shown) to be charged.

A connector 610 includes a base 615, which has a set of triangularly arranged depending retractable plungers 617, 618 and 619. The three plungers provide a firm mechanical engagement with a battery under charge, in a similar manner as the plungers of the connector 510 perform a similar function. The plunger 617 includes a downwardly depending pin or contact 621 extending from a sleeve 617 fixed to a housing 630 in a similar manner as the plunger 517 of FIG. 12. At its upper end, the plunger 621 is electrically connected at its upstanding terminal 661 to an electrical cable or lead 663 in a similar manner as the plungers 517 and 518 are connected electrically to the cable 525. A pin 667 secures the end portion of the cable or lead 663 to the base 615.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A universally adaptable electrical connector for coupling electrically a terminal device having at least one electrical connection point and an electrical device comprising:

base means having an electrical conductor supported thereat for helping to establish an electrical path between the terminal device and the electrical device;

three spaced apart spring loaded plunger means extending outwardly perpendicularly from said base means and arranged in a triangular pattern for engaging resiliently the terminal device in a stable manner, at least one of said plunger means including a retractable electrode means for engaging electrically the electrical connection point to help establish an electrical connection between said electrical conductor and said at least one electrical connection point;

at least another one of said plunger means including a retractable stabilizing means mounted to said base means for pressing resiliently into non-electrical engagement with said terminal device to help maintain electrical and mechanical contact between said at least one connection point and said electrode means and for helping to stabilize the position of said base means in a substantially parallel spaced apart manner from said terminal device to help prevent said base means from rocking inadvertently and interrupting the electrical and mechanical contact between said connection point and said electrode means; and whereby the electrode means can be positioned in engagement with said at least one electrical connection point and secured removably thereto for establishing said electrical path.

2. A universally adaptable connector as recited in claim 1, further comprising:

adjustment means adapted to engage said base means for pressing said retractable electrode means into resilient engagement with the electrical connection point and for pressing said retractable stabilizing means into resilient engagement with the terminal device to help maintain electrical and mechanical contact between the plunger means and the terminal device.

3. A universally adaptable connector as recited in claim 2, wherein said adjustment means is strap means; and wherein said strap means is adapted to engage said base means opposite said plunger means for securing removably said base means to said terminal device and for helping to press said stabilizing means into engagement with said terminal device and said electrode means into engagement with said at least one connection point.

4. A universal adaptable connector as recited in claim 3, wherein said strap means includes means for engaging releasably the terminal device.

5. A universally adaptable connector as recited in claim 4, wherein said strap means is elastic means.

6. A universally adaptable connector as recited in claim 5, wherein said elastic means is a rubber band.

7. A universally adaptable connector as recited in claim 6, wherein said means for engaging is bracket means.

8. A universally adaptable connector as recited in claim 3, wherein said strap means includes buckle means for helping fasten said strap means removably on the terminal device.

9. A universally adaptable electrical connector for coupling electrically a terminal device having at least one electrical connection point and an electrical device comprising:

probe head means for engaging electrically and mechanically the terminal device to facilitate the coupling electrically of the terminal device to the electrical device;

said probe head means including base means having an electrical conductor supported thereat for helping to establish an electrical path between the terminal device and the electrical device, telescoping electrode means depending downwardly perpendicularly from an underside of said base means and coupled electrically to said electrical conductor for engaging resiliently said at least one electrical connection point mechanically and electrically to establish an electrical connection between said electrical conductor and said at least one electrical connection point, and telescoping stabilizing means depending downwardly perpendicularly from said underside for pressing resiliently into engagement with said terminal device to help maintain electrical and mechanical contact between said at least one electrical connection point and said electrode means and for helping to stabilize the position of said base means in a substantially parallel spaced apart manner from said terminal device to help prevent said base means from rocking inadvertently and interrupting the electrical and mechanical contact between said connection point and said electrode means;

elongated strap means having an engageable material disposed on one of its surfaces for encircling the terminal device and said probe head means to help secure removably said probe head means to the terminal device, said base mean further including a strap engageable surface opposite said underside for receiving said strap means wherein said electrical conductor extends transversely from said base means between said strap engageable surface and said underside;

buckle means attached at one terminal end of said strap means for enabling said strap means to be tightened around the terminal device and said probe head means for pressing said electrode means and said stabilizing means into engagement with said terminal device;

securing means coupled to said strap means for removably securing said strap means in a desired tightened position;

whereby said strap means engages said strap engageable surface to press said electrode means and said stabilizing means into engagement with the terminal device and said securing means secures said strap means in said desired tightened position to help said probe head to be maintained in mechanical and electrical contact with the terminal device.

10. A universally adaptable electrical connector according to claim 9, wherein said electrode means is spring biased for mechanically and electrically engaging the electrical connection point, and said stabilizing means is spring biased for cooperating with said spring biased electrode means to stabilize said probe head means in such a manner that said electrode means remains in mechanical and electrical contact with the electrical connection point.

11. A universally adaptable electrical connector according to claim 10, further comprising:

securing means coupled removably to both of the strap means and the probe head means for securing said probe head means to said straps means.

12. A universally adaptable electrical connector according to claim 11, wherein said securing means includes a pair of oppositely disposed surfaces, each surface having engaging means disposed thereon.

13. A universally adaptable electrical connector according to claim 10, wherein said stabilizing means is configured with said spring loaded electrode means to form an imaginary equilateral triangle for stabilizing purposes.

14. A universally adaptable electrical connector according to claim 10, wherein said stabilizing means and said spring loaded electrode means are staggered relative to one another in a nonlinear manner for stabilizing purposes.

15. A universally adaptable electrical connector according to claim 10, wherein said stabilizing means generally circular shaped.

16. A universally adaptable electrical connector according to claim 10, wherein said stabilizing means includes at least two aligned plungers.

17. A universally adaptable electrical connector according to claim 10, wherein said stabilizing means includes three aligned plungers.

18. A universally adaptable electrical connector according to claim 10, wherein said stabilizing means is a compression ring.

19. A universally adaptable electrical connector according to claim 10, wherein said stabilizing means is resilient.

20. A universally adaptable electrical connector according to claim 10, wherein said stabilizing means is retractable to accommodate irregularities in connection surfaces.

21. A universally adaptable electrical connector according to claim 10, wherein said probe head is composed of a molded material.

22. A universally adaptable electrical connector according to claim 10, wherein said probe head is generally circular in shape.

23. A universally adaptable electrical connector according to claim 10, wherein said probe head is generally rectangular in shape.

24. A universally adaptable electrical connector according to claim 10, wherein said probe head includes an electrical jack for replacement purposes.

25. A universally adaptable electrical connector according to claim 18, wherein said compression ring is composed of a resilient material.

26. A universally adaptable electrical connector according to claim 9, wherein said engagable material is a pile material.

27. A universally adaptable electrical connector according to claim 9, wherein said engagable material is a hooked material.

28. A universally adaptable electrical connector according to claim 26, wherein said engaging means is a plurality of hooks for engaging said pile material.

29. A universally adaptable electrical connector according to claim 27, wherein said engaging means is a pile material.

30. A universally adaptable electrical connector according to claim 10, wherein said resilient stabilizing means includes at least one plunger.

31. A connector for maintaining a probe head having a strap engageable surface and a plurality of downwardly depending retractable plunger members in engagement with a terminal device, comprising:

an elongated strap means having an outer surface and an inner surface and an engaging material disposed on said outer surface to facilitate maintaining the strap means in a desired tightened position, said strap means engaging the strap engageable surface to press the plunger members into engagement with the terminal device;

a buckle means having an opening and secured at one end of said strap means for receiving the other end of said strap means therethrough to enable the strap means to be adjusted about the terminal device and the probe head, wherein the buckle means enables said engaging material to be disposed in two opposing sections; and     securing means disposed between said two opposing sections for securing said opposing sections to one another to help maintain said plunger members in pressing engagement with the terminal device.

\* \* \* \* \*